United States Patent
De Franca Lima et al.

(10) Patent No.: US 9,730,261 B2
(45) Date of Patent: Aug. 8, 2017

(54) HIERARCHICAL PROTOCOL CLASSIFICATION

(75) Inventors: Octavio Jose De Franca Lima, The Colony, TX (US); Ke-Chi Jang, Plano, TX (US)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 1837 days.

(21) Appl. No.: 12/770,853

(22) Filed: Apr. 30, 2010

(65) Prior Publication Data

US 2011/0176536 A1     Jul. 21, 2011

Related U.S. Application Data

(60) Provisional application No. 61/295,827, filed on Jan. 18, 2010.

(51) Int. Cl.
*H04L 12/66* (2006.01)
*H04W 76/02* (2009.01)
*H04W 36/00* (2009.01)

(52) U.S. Cl.
CPC ...... *H04W 76/026* (2013.01); *H04W 36/0022* (2013.01)

(58) Field of Classification Search
CPC .... H04L 12/66; H04W 76/02; H04W 36/0022
(Continued)

(56) References Cited

U.S. PATENT DOCUMENTS 6,879,581 B1 * 4/2005 Leung ........................... 370/352
8,041,335 B2 * 10/2011 Khetawat et al. ......... 455/404.2

(Continued)

FOREIGN PATENT DOCUMENTS

CN    101483896 A    7/2009

OTHER PUBLICATIONS

"E-UTRAN—cdma2000 1x Connectivity and Interworking Air Interface Specification (3GPP2 C.S0097-0 Revision 0, Version 0.4)", Jan. 28, 2010 (Jan. 28, 2010)XP55002312, Retrieved from the Internet: URL:http://ftp.tiaonline.org/tr-45/TR-45.5/Incoming/TR-455-20100125_Bangkok/TR-455_Plenary/C20-20100125-108B%20C.P0097_1x-EUTRANInterworking_vo.4.pdf [retrieved on Jul. 8, 2011].

(Continued)

*Primary Examiner* — Asad Nawaz
*Assistant Examiner* — Jason Harley

(57) ABSTRACT

A hierarchical protocol classification and signaling method specifies the interworking protocols used to send circuit-switched signaling messages to and from a mobile terminal in a packet-switched network. A set of possible interworking protocols are divided into two more classes that correspond to different types of interworking protocols. Within each class, different versions of the interworking protocol are specified by a revision value. The versions of the interworking protocols within a given class are may be denominated such that the versions with a higher revision value are backward compatible with versions having a lower value. When a circuit services domain message is sent from a sending device to a receiving device, an interworking option specifying the class/revision of the interworking protocol is transmitted along with circuit services domain messages. The interworking option may be inserted into the header of a tunneling packet containing the circuit services domain message.

24 Claims, 6 Drawing Sheets

(58) Field of Classification Search
USPC .......................................................... 370/352
See application file for complete search history.

(56) References Cited

U.S. PATENT DOCUMENTS

| | | | | |
|---|---|---|---|---|
| 2002/0093930 | A1* | 7/2002 | Dertz | H04W 72/1242 370/337 |
| 2002/0101875 | A1* | 8/2002 | Lui | H04L 12/462 370/402 |
| 2003/0193911 | A1* | 10/2003 | Zhao | H04W 36/0066 370/331 |
| 2003/0193959 | A1* | 10/2003 | Lui | H04L 12/462 370/401 |
| 2003/0196911 | A1* | 10/2003 | Palmer | C25C 3/08 205/372 |
| 2009/0168783 | A1* | 7/2009 | Mohan et al. | 370/395.5 |
| 2009/0213826 | A1* | 8/2009 | Wang et al. | 370/338 |
| 2010/0125680 | A1* | 5/2010 | Kim et al. | 710/11 |

OTHER PUBLICATIONS

Digital cellular telecommunications systems (Phase 2+); Universal Mobile Telecommunications System (UMTS); LTE; Circuit Switched (CS); fallback in Evolved Packet System (EPS); Stage 2 (3GPP TS 23.272 v9.3.0 Release 9). ETSI TS 123 272 v9.3.0 (Mar. 2010).

$3^{rd}$ Generation Partnership Project; Technical Specification Group Core Network and Terminals; Optimised Handover Procedures and Protocol Between EUTRAN access and non-3GPP accesses (S102); Stage 3 (Release 9). 3GPP TS 29.277 v9.0.0 (Dec. 2009).

Digital cellular telecommunications system (Phase 2+); Universe Mobile Telecommunications System (UMTS); LTE; Single Radio Voice Call Continuity (SRVCC); Stage 2 (3GPP TS 23.216 v9.3.0 Release 9). ETSI TS 123 216 v9.3.0 (Mar. 2010).

LTE; Evolved Universal Terrestrial Radio Access Network (E-UTRAN); Improved network controlled mobility between E-UTRAN and 3GPP2/mobile WiMAX radio technologies (3GPP TR 36.938 v 9.0.0 Release 9). ETSI TR 136 938 v9.0.0 (Feb. 2010).

Ericsson: "Handling of congestion for e1xCSFB". 3GPP TSG-RAN WG2 Meeting #68. Nov. 2009, Jeju Korea.

* cited by examiner

HIERARCHICAL PROTOCOL CLASSIFICATION

RELATED APPLICATION

This application claims the benefit of U.S. Provisional Patent Application 61/295,827 filed Jan. 18, 2010, which is incorporated herein by reference.

BACKGROUND

In the past, mobile communication systems have primarily used circuit-switched networks to provide voice services and low speed data services and packet-switched networks for high-speed data services. In circuit-switched networks, a dedicated channel is allocated for each voice or data call. In packet-switched networks, data is transmitted in packets over shared network resources. In general, packet-switched networks provide increased bandwidth efficiency as compared to circuit-switched network, while circuit-switched networks typically provide higher quality of service guarantees. In third generation (3G) packet-switched data networks have been integrated with circuit-switched voice networks to provide both voice and data services.

The fourth generation (4G) standard under development known as Long Term Evolution (LTE) is a packet-switched network and does not have inherent support for voice services. A number of proposals are under consideration for providing voice communications in LTE networks. However, it is uncertain at this point whether the initial roll-out of LTE systems will include support for voice communications. If support for voice communications is not available, the service providers can leverage existing circuit-switched networks to provide voice services. Even if the early LTE systems support voice communications, the service providers will likely phase in LTE systems gradually and leverage existing 3G networks to provide service in areas where LTE networks do not provide coverage. Therefore, interworking protocols are needed to enable interworking between LTE and existing circuit-switched networks.

Several proposals are being considered to enable interworking between 3G and 4G networks to allow service providers to leverage existing networks and gradually phase in LTE networks. One approach to interworking is known as Single Radio Voice Call Continuity (SRVCC). The SRVCC approach allows a LTE voice call to be handed over to a 3G network when LTE coverage is not available. The SRVCC approach is described in 3GPP TS.23.216. Another interworking approach is known as Circuit-Switched Fallback (CSFB). CSFB is an interworking mechanism that allows service providers to use existing circuit-switched networks to provide voice services to LTE users. A mobile user can register with the circuit-switched network after attaching to the LTE network. For voice communications, the user is redirected from the LTE network to a legacy network providing voice services.

To implement interworking protocols, an interworking function will be added to existing circuit-switched networks to enable circuit services domain messages to be sent to and from mobile terminals operating in the LTE network. To implement the interworking function, a mechanism is needed to specify the interworking protocol.

SUMMARY

The present invention provides a hierarchical protocol classification and signaling method to specify the interworking protocols used to send circuit-switched signaling messages to and from a mobile terminal in a packet-switched network. A set of possible interworking protocols are divided into two more classes that correspond to different types of interworking protocols. For example, interworking protocols based on SRVCC are assigned to one class and interworking protocols based on CSFB are assigned to a different class. Within each class, different versions of the interworking protocol are specified by a revision value. In a preferred embodiment, the versions of the interworking protocols within a given class are denominated such that the versions with a higher revision value are backward compatible with versions having a lower value. When a circuit services domain message is sent from a sending device to a receiving device, an interworking option specifying the class/revision of the interworking protocol is transmitted along with circuit services domain messages. The interworking option may be inserted into the header of a tunneling packet containing the circuit services domain message.

DETAILED DESCRIPTION

Figure 1:
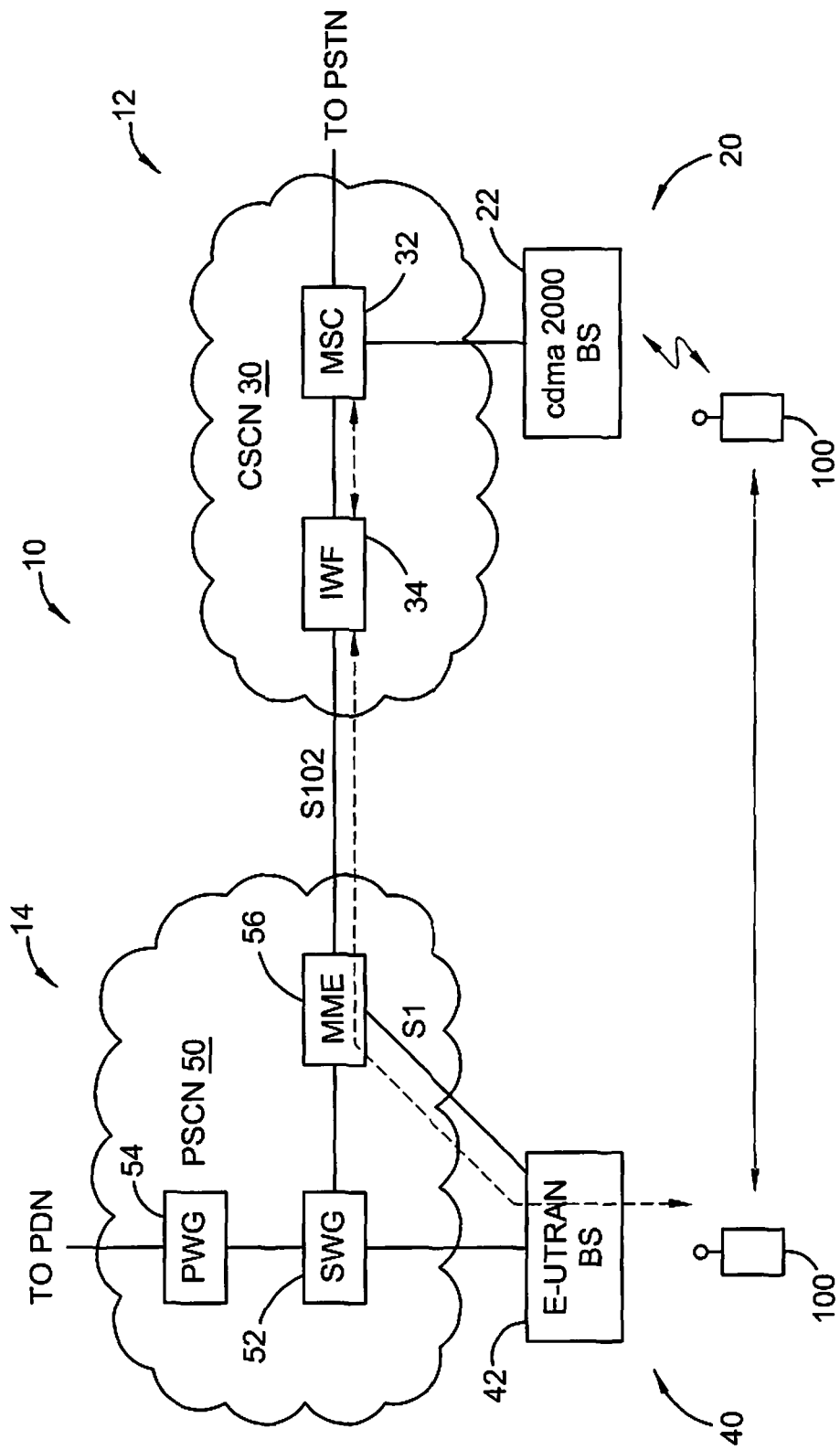
FIG. 1 illustrates an exemplary network architecture for interworking between an LTE network and a 1×RTT network.

Referring now to the drawings, the present invention will be described in the context of a hybrid network 10 providing both voice and data services to mobile terminals 100. In the exemplary embodiment shown herein, the hybrid network 10 combines a cdma2000 network 12 for circuit-switched services and an LTE network 14 for data services. Those skilled in the art will appreciate that the cdma2000 network 12 may, in some embodiments, also provide data services in addition to circuit-switched services. The exemplary embodiment is intended to be illustrative only and those skilled in the art will appreciate that the present invention may be used in networks based on other network standards.

The cdma2000 network 12 comprises a cdma2000 radio access network 20 connected to a circuit-switched core network (CSCN) 30. The cdma2000 radio access network comprises one or more base stations 22 for communicating with mobile terminals 100 in the coverage area of the cdma2000 radio access network 20. Though shown as a single entity in FIG. 1, the base stations 22 typically comprise a base transceiver station (BTS) and base station controller (BSC), which may embodied in different network nodes at different locations. The BTS includes the radio equipment for communicating with the mobile terminal over the air interface, while the BSC provides radio resource control and management functions for one or more BTSs.

The CSCN 30 includes a Mobile Switching Center (MSC) that provides a connection to the public switched telephone network (PSTN) 16 and switches calls to and from the mobile terminal 100. The base stations 22 forward downlink traffic and signaling from the MSC 22 to the mobile terminals 100 and forward uplink traffic and signaling from the mobile terminals 100 to the MSC 22.

The LTE network 14 comprises an LTE radio access network 40 connected to a packet-switched core network 50. The LTE radio access network 14 comprises one or more access nodes (ANs) 42 for communicating with mobile terminals 100 in the coverage area of the LTE radio access network 20. The LTE radio access network 40 is also referred to as a Evolved Universal Terrestrial Radio Access Network (E-UTRAN) and the access nodes 42 are also known as Evolved NodeBs (eNodeBs). The access nodes or eNodeBs 42 are analogous to the base stations 22 in the cdma200 network except that the access nodes 42 combine the functions of the BTS and BSC into a single network node. The PSCN 50, also known as an Evolved Packet Core (EPC), includes a Serving Gateway (SGW) 52, Packet Data Network Gateway (PGW) 54, and Mobility Management Entity (MME) 56. The SGW 52 and PGW 54 provide connection to external packet data networks (PDNs), such as the Internet. The SGW 52 is a user-plane node connecting the PSCN 50 to the ANs 42 in the LTE radio access network 40 and serves as a mobility anchor point for the mobile terminal 100 as it moves between cells. The PGW 54 is a user-plane node connecting the PSCN to external packet data networks (PDNs), such as the Internet. The MME 56 is a control plane node that handles the control functions of the PSCN 50, such as mobility management, billing, etc.

When a mobile terminal 100 is operating within the LTE radio access network 40, the mobile terminal 100 may still want to receive notifications from the MSC 22 relating to circuit services without having to periodically return to the cdma2000 radio access network 20 to receive such notifications. For example, mobile terminal 100 may want to receive paging messages over the LTE radio access network 40 alerting the mobile terminal 100 to incoming voice calls.

To enable interworking between the LTE and cdma2000 networks 12, 14, the CSCN 30 includes an interworking function (IWF) 34. The IWF 34 may be incorporated into an existing network node in the CSCN 30, or may be a stand-alone node. The IWF 34 includes a Circuit Services Notification Application (CSNA) to enable circuit services domain messages to be sent between the MSC 32 in the CSCN 30 and a mobile terminal 100 operating in the LTE network 12.

More specifically, the CSNA provides a mechanism for a mobile terminal 100 operating in the packet-switched network to register with the MSC 32 in the CSCN 30 and receive circuit services notifications, such as paging messages, over the packet-switched network 20. When the mobile terminal 100 registers with the MSC 32, the MSC 32 will send all circuit services domain messages to the mobile terminal 100 via the IWF 34. The mobile terminal 100 in turn will send circuit services domain messages to the MSC 32 via the IWF 34. The CSNA is described in E-UTRAN—cdma2000 1× Connectivity and lnterworking Air Interface Specification, 3GPP2 C.S0097-0v0.4 (Jan. 28, 2010), which is incorporated herein in its entirety by reference.

In some scenarios, the circuit services domain messages sent to the mobile terminal 100 may prompt the mobile terminal 100 to transition to the cdma2000 radio access network 20. As one example, the IWF 34 may send a page message to the mobile terminal 100 responsive to the paging request from the MSC 32 causing the mobile terminal 100 to transition to the cdma2000 radio access network 20 to receive a voice call. In other scenarios, the mobile terminal 100 may autonomously transition to the cdma2000 radio access network 20. For example, the mobile terminal 100 may transition to the cdma2000 radio access network 20 to originate a voice call. In other embodiments, the mobile terminal 100 engaged in a voice call over the packet-switched network 14 may be handed over to the circuit-switched network 12 to continue the call when the mobile terminal 100 moves beyond the coverage area of the packet-switched network 14.

There are several possible approaches to interworking between the circuit-switched and packet-switched networks. One approach to interworking known as Single Radio Voice Call Continuity (SRVCC) allows a LTE voice call to be handed over to a 3G network when LTE coverage is not available. The SRVCC approach is described in 3GPP TS.23.216. Another interworking approach known as Circuit-Switched Fallback (CSFB) allows service providers to use existing circuit-switched networks to provide voice services to LTE users. The CSFB approach is described in 3GPP TS.23.272. For a given interworking approach, there may be two or more existing versions of the interworking protocol. For example, there are currently two versions of the CSFB interworking protocol for LTE/cdma2000 interworking. The IWF 34 may implement different CSNAs depending on the class and version of the interworking protocol. Therefore, a mechanism is needed to specify the interworking protocol.

According to one exemplary embodiment of the present invention, a hierarchical protocol classification and signaling method is used to specify the interworking protocols for sending circuit services domain messages between a mobile terminal 100 in a packet-switched network 14 and the IWF 34 in the circuit-switched network 12. The universe of possible interworking protocols is divided into two or more classes that correspond to different types of interworking protocols. For example, interworking protocols based on SRVCC are assigned to one class and interworking protocols based on CSFB are assigned to a different class. Within each class, different versions of the interworking protocol are specified by a revision value. In a preferred embodiment, the versions of the interworking protocols within a given class are denominated such that the versions with a higher revision value are backward compatible with versions having a lower value. An interworking option specifying the class/revision of the interworking protocol is transmitted along with circuit services domain messages when either the mobile terminal 100 or IWF 34 sends a circuit services domain message. The interworking option may, for example, be inserted into the header of a tunneling packet containing the circuit services domain message.

Figure 2:
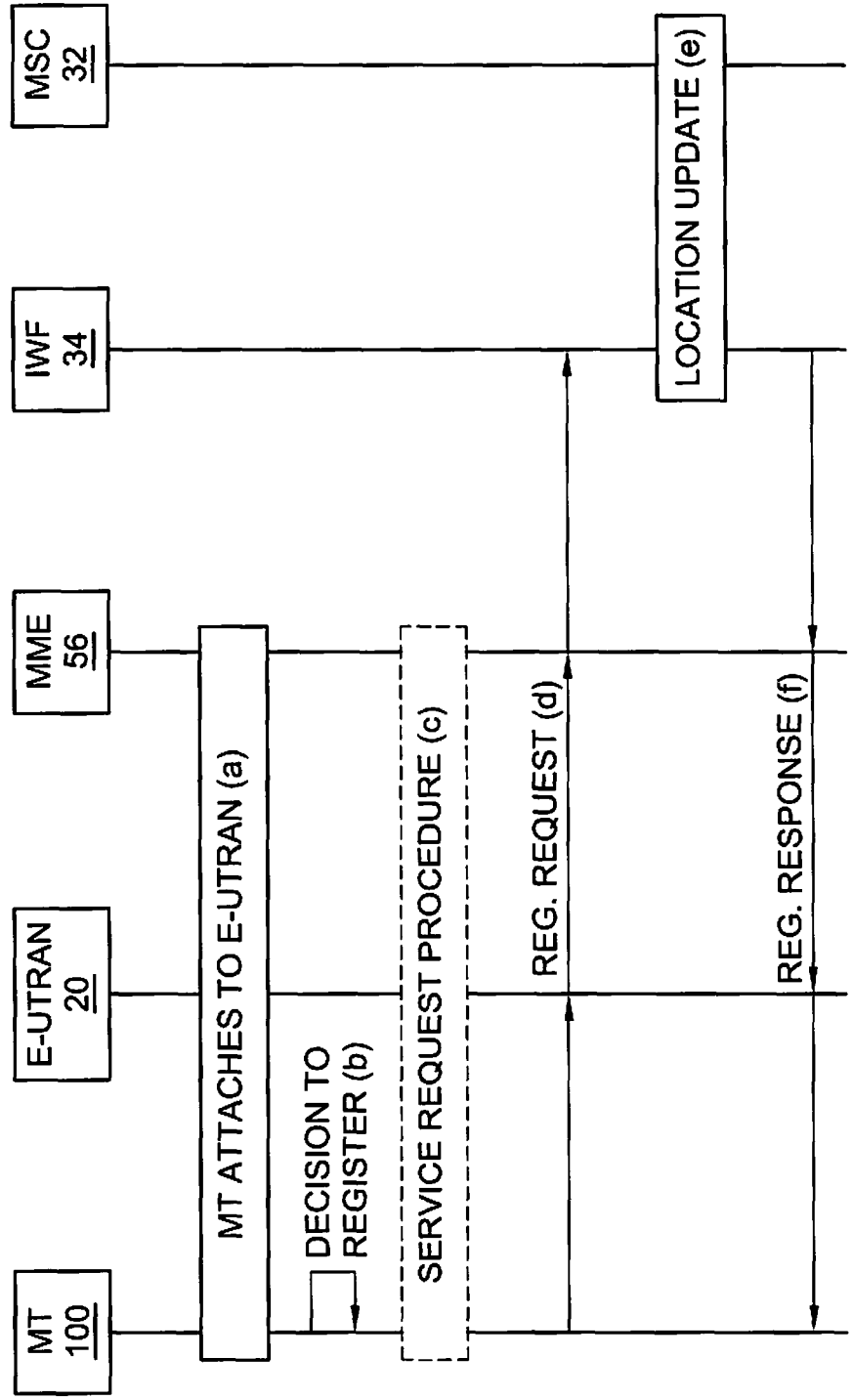
FIG. 2 illustrates an exemplary procedure for registering a mobile terminal in a LTE network with a cdma2000 network.

FIG. 2 illustrates a procedure for registration of a mobile terminal 100 in the packet switched network with the MSC 32 in the CSCN 30. The mobile terminal 100 attaches to the E-UTRAN as specified in TS 23.401 (step a). When the mobile terminal 100 attaches to the E-UTRAN, the mobile terminal 100 indicates its interworking capabilities. For example, the mobile terminal 100 may indicate to the MME that it is capable of circuit switched fallback to the cdma2000 network. Though not material to the present invention, the mobile terminal 100 may further indicate whether it is capable of maintaining concurrent voice and data sessions in the cdma2000 network.

After the mobile terminal 100 is attached to the E-UTRAN, the mobile terminal 100 decides to register with the cdma2000 network (step b). The decision to register with the cdma2000 network may be triggered, for example, by an indication from the E-UTRAN when the mobile terminal 100 is in a connected state. If the mobile terminal 100 is in an idle state at the time it attempts to register with the circuit switched network, the mobile terminal may need to perform a service request procedure to create a signaling connection with the MME (step c).

Once the signaling connection with the MME is established, the mobile terminal 100 generates a registration request and sends the registration request to the interworking function 3 (step d). More particularly, the mobile terminal 100 encapsulates the registration request in a CSNA tunneling packet and transmits the registration request to the E-UTRAN over the air interface. The E-UTRAN forwards the CSNA packet to the MME over the S1 interface which, in turn, forwards the CSNA packet to the IWF 34 over the S102 interface. The interworking function 34 performs a location update (step e) and sends a registration response to the mobile terminal 100 (step f).

Figure 3:
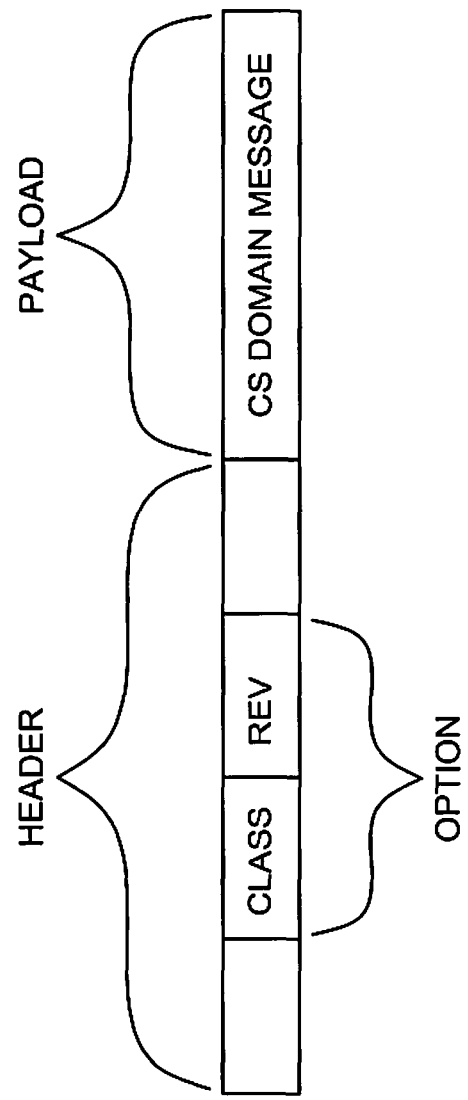
FIG. 3 illustrates a tunneling packet used for sending circuit services domain messages between a mobile terminal in an LTE network and an interworking function in a cdma2000 network.

FIG. 3 illustrates an exemplary CSNA packet for sending circuit services domain messages, such as the registration request, between a mobile terminal in the packet switched network and the IWF 34. The CSNA packet includes a payload and a header. The payload includes the circuit services domain message, such as the registration request. The header of the CSNA packet includes an option field that indicates the interworking protocol supported by the mobile terminal 100. As previously noted, the option fields includes two parts specifying the class and revision of the interworking protocols supported by the mobile terminal 100. For example, the class value may indicate whether the mobile terminal 100 supports CSFB or SRVCC protocols. The revision value indicates the highest version of the CSFB or SRVCC protocols supported by the mobile terminal 100. Preferably, versions of the interworking protocols with higher revision values are backward compatible with versions having a lower value. Thus, the revision value indicates to the receiving device that the mobile terminal 100 supports the specified version of the interworking protocol and lower versions.

Returning to FIG. 2, the interworking function 34 and MSC 32 perform a location update procedure to register the mobile terminal 100 for circuit services (step e). After the location update procedure is complete, the IWF 34 sends a registration response to the mobile terminal 100 via the MME and E-UTRAN (step f). More specifically, the IWF 34 encapsulates the registration response in a CSNA packet and forwards the packet to the MME over the S102 interface. The MME forwards the CSNA packet to the E-UTRAN over the S1 interface. A base station in the E-UTRAN then transmits the registration response to the mobile terminal 100 over the air interface.

There may be some circumstances when the IWF 34 does not support the interworking protocol specified by the mobile terminal 100. In the case where the IWF 34 does not support the interworking protocol selected by the mobile terminal 100, the IWF may send a CSNA service reject message with a call value indicating that the interworking option is invalid. The service reject message may also include an interworking option value to indicate the interworking option supported by the IWF 34. If the mobile terminal 100 receives a service reject message from the IWF 34, the mobile terminal 100 may resend the registration request using the interworking options specified by the IWF 34 in the service reject message.

In other scenarios, the IWF 34 may recognize the registration request even though the IWF 34 does not fully support the interworking option specified by the mobile terminal 100. In this case, the IWF 34 may perform the location update as previously described and send a registration response to the mobile terminal 100 with an interworking option indicating the interworking protocols supported by the IWF 34. In this case, the mobile terminal 100 shall use the interworking protocols specified by the IWF 34 to send circuit services domain messages to the IWF 34.

Figure 4:
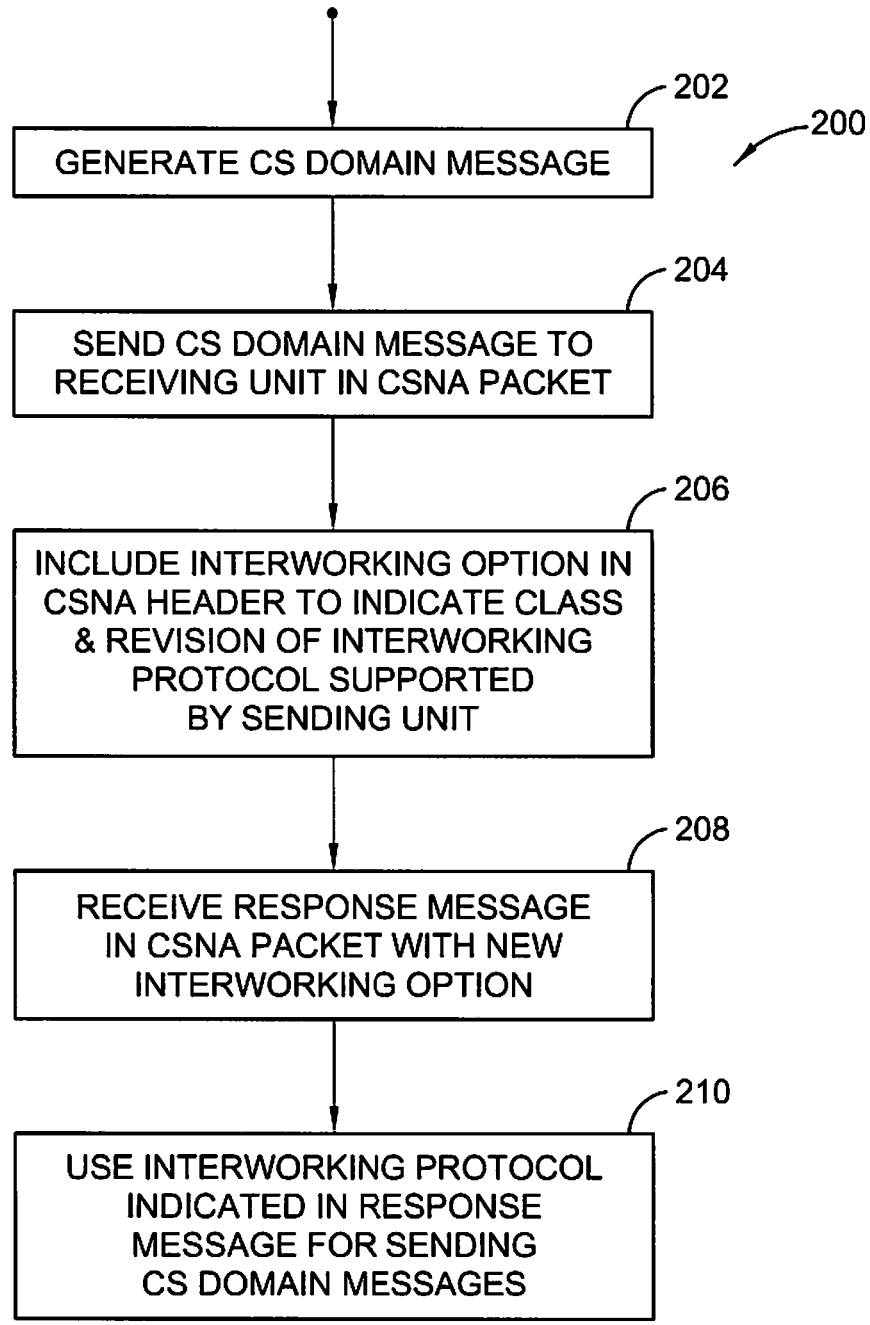
FIG. 4 illustrates an exemplary interworking procedure implemented by a sending device.

FIG. 4 illustrates an exemplary method for sending circuit services domain messages between a mobile terminal 100 in a packet switched network and an interworking function 34 in a circuit switched network. The method may be performed by either the mobile terminal 100 or interworking function 34. The method begins when the sending device generates a circuit services domain message (block 102). The circuit services domain message is encapsulated in a CSNA packet and tunneled to the receiving device (block 104). The CSNA packet includes a header containing an interworking option to indicate the class and revision of the interworking protocol used by the sending device (block 106). The sending device subsequently receives a response message, which may include a new interworking option indicating the interworking protocol supported by the receiving device (block 108). If the interworking option specified in the response message includes a revision value lower than the revision value in the original message, the sending device will use the interworking protocols specified in the response message for sending further circuit services domain messages to the receiving device (block 110).

Figure 5:
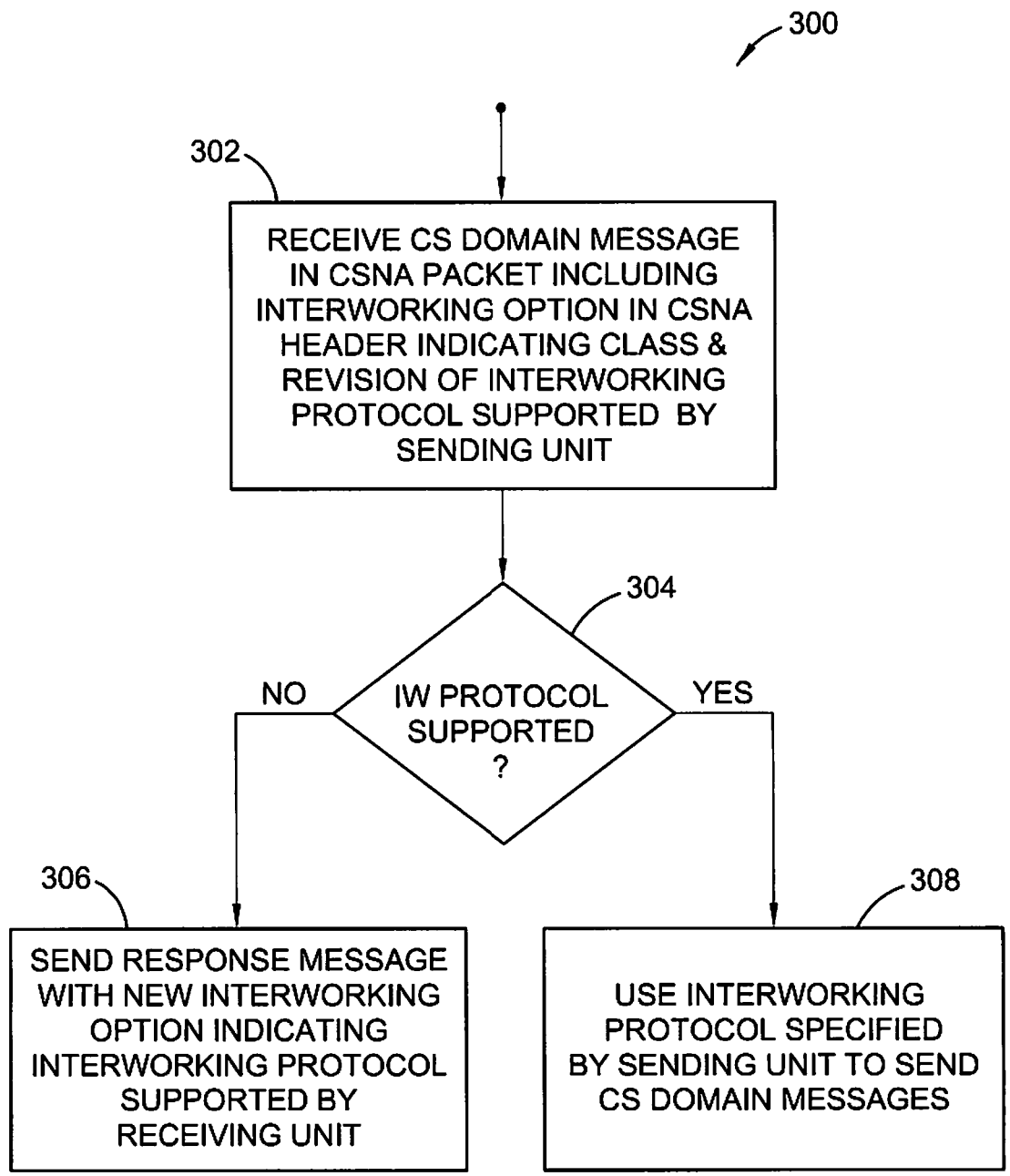
FIG. 5 illustrates an exemplary interworking procedure implemented by a receiving device.

FIG. 5 illustrates an exemplary procedure implemented by a receiving device. The receiving device may be either the mobile terminal 100 or interworking function 34. The procedure begins when the receiving device receives a circuit services domain message encapsulated in a CSNA packet (block 152). The header of the CSNA packet includes an interworking option indicating the class and revision of the interworking protocol supported by the sending device (block 154). In the case where the interworking protocol is not supported by the receiving device, the receiving device sends a response message with a new interworking option to indicate the interworking protocols supported by the receiving device (block 156).

Figure 6:
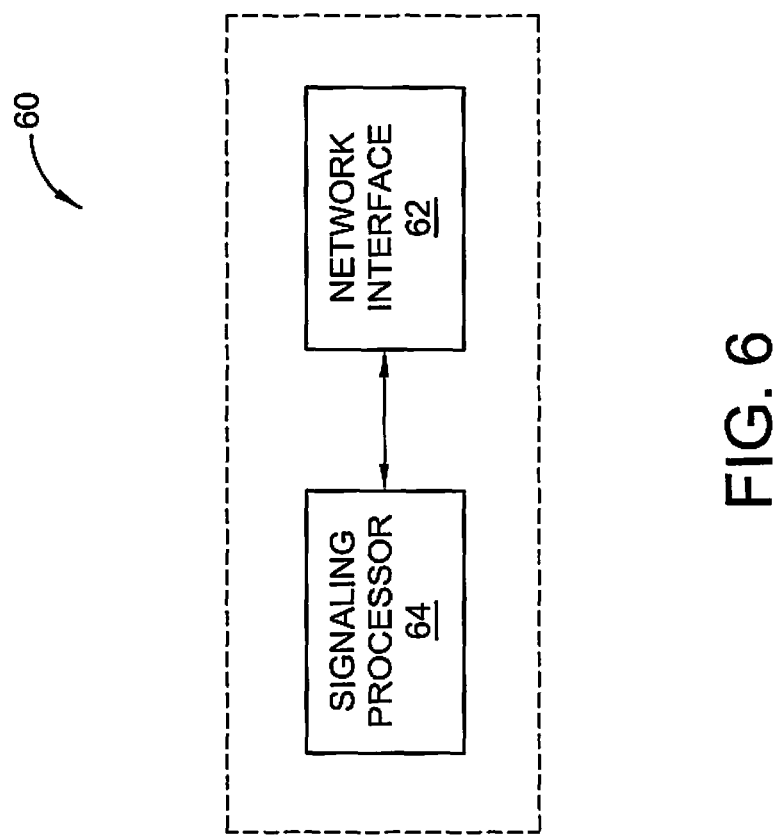
FIG. 6 illustrates an exemplary network node that may function as either a sending device or receiving device for sending/receiving circuit services domain messages.

FIG. 6 illustrates an exemplary network node to enable interworking between circuit switched and packet switched networks. The network node may function either as a sending device or receiving device, depending on the direction of communications. For example, the network node may comprise a mobile terminal 100 capable of sending circuit services domain messages to an interworking function in the circuit switched network, and receiving circuit services domain messages from the interworking function. The network node may also comprise an IWF 34 for sending circuit services domain messages to a mobile terminal 100 in the packet switched network, and receiving circuit services domain messages from the mobile terminal 100.

The network node 60 comprises two main components: a network interface 62 and signaling processor 64. The network interface 62 connects the network node 60 to either the packet switched 14 or circuit switched network 12. In the case of a mobile terminal 100, the network interface 62 comprises a cellular transceiver operable in both the E-UTRAN and cdma2000 radio access networks. In the case of an interworking function 34, the network interface 62 may comprise an Ethernet interface for connecting the interworking function 34 with the circuit switched core network 30. The signaling processor comprises the main logic for sending, receiving, and processing circuit services domain messages. The signaling processor may comprise one or more microprocessors, hardware, firmware, or a combination thereof. In one exemplary embodiment, the signaling processor comprises a microprocessor executing code to implement the procedures shown in FIGS. 2, 4, and 5.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of interworking between a packet-switched network and a circuit-switched network, said method comprising:
generating a tunneling packet encapsulating a circuit services domain message;
sending said tunneling packet with said circuit services domain message from a sending device in one of the circuit-switched or packet-switched networks to a receiving device in the other one of the circuit-switched and packet switched networks; and
including an interworking option in a header of said tunneling packet to indicate an interworking protocol used by the sending device, said interworking option comprising an interworking class value indicating a class of the interworking protocol used by the sending device and a revision value indicating a version of the interworking protocol within the given class used by the sending device, wherein the revision value is selected from a set of hierarchical values to indicate backward compatibility between the designated version of the interworking protocol and at least one other version of the interworking protocol.

2. The method of claim 1 wherein the circuit services domain message is sent by a mobile terminal in a packet-switched network to an interworking function in said circuit-switched network.

3. The method of claim 1 wherein the circuit services domain message is sent by an interworking function in said circuit-switched network to a mobile terminal in the packet-switched network.

4. The method of claim 1 further comprising receiving a response message from said receiving device, said response message containing a new interworking option indicating an interworking protocol supported by the receiving device.

5. The method of claim 4 further comprising using the interworking protocol identified by the new interworking option in the response message for sending subsequent circuit services domain messages.

6. The method of claim 1, wherein the versions of the interworking protocols within a given class are denominated such that the versions of the interworking protocols with a higher revision value are backward compatible with the versions of the interworking protocol having a lower value.

7. A method of interworking between a packet-switched network and a circuit-switched network, said method comprising:
receiving a circuit services domain message for a circuit-switched service encapsulated in a first tunneling packet sent from a sending device in one of the circuit-switched or packet-switched networks to a receiving device in the other one of the circuit-switched and packet switched networks; and
said first tunneling packet comprising a header containing an interworking option indicting the interworking protocol used by the sending device, said interworking option including a class value indicating a class of the interworking protocol used by the sending device and a revision value indicating a version of the interworking protocol within the given class used by the sending device, wherein the revision value is selected from a set of hierarchical values to indicate backward compatibility between the designated version of the interworking protocol and at least one other version of the interworking protocol.

8. The method of claim 7 wherein the circuit services domain message is received by a mobile terminal in a packet-switched network from an interworking function in said circuit-switched network.

9. The method of claim 7 wherein the circuit services domain message is received by an interworking function in said circuit-switched network from a mobile terminal in a packet-switched network.

10. The method of claim 7 further comprising
determining whether the interworking protocol indicated by the interworking option is supported by the receiving device;
if the specified interworking option is not supported, sending a response message containing a new interworking option indicating an interworking protocol supported by the receiving device.

11. The method of claim 10 wherein the new interworking option in the response message comprises a lower revision value to indicate the version of the interworking protocol supported by the receiving device.

12. The method of claim 10 further comprising using the interworking protocol indicated by the new interworking option for subsequent signaling between the sending device and receiving device.

13. A sending device to enable interworking between a circuit-switched and packet-switched network, said sending device comprising:
a network interface for connecting the sending device to one of said circuit-switched and packet-switched networks;
a signaling processor connected to said network interface to generate a tunneling packet encapsulating a circuit services domain message and to send said tunneling packet over one of a circuit-switched or packet-switched networks to a receiving device in the other one of said circuit-switched and packet-switched networks;
said tunneling packet comprising a header containing an interworking option indicating an interworking protocol used by the sending device, said interworking option comprising an interworking class value indicating a class of interworking protocol used by the sending device and a revision value indicating a version of the interworking protocol within the given class used by the sending device, wherein the signaling processor selects the revision value form a hierarchical set of revision values to indicate backward compatibility of the designated version of the interworking protocol with one or more other versions of the interworking protocol.

14. The sending device of claim 13 wherein the sending device comprises a mobile terminal in a packet-switched network and the receiving device comprises an interworking function in said circuit-switched network.

15. The sending device of claim 13 wherein the sending device comprises an interworking function in said circuit-switched network and the receiving device comprises a mobile terminal in a packet-switched network.

16. The sending device of claim 13 wherein the signaling processor is further configured to receive a response message from said receiving device, said response message containing a new interworking option indicating an interworking protocol supported by the receiving device.

17. The sending device of claim 16 wherein the new interworking option in the response message comprises a lower revision value to indicate the version of the interworking protocol supported by the receiving device.

18. The sending device of claim 16 wherein the signaling processor is further configured to use the interworking protocol identified by the new interworking option in the response message for sending subsequent circuit services domain messages.

19. A receiving device to enable interworking between a circuit-switched and packet-switched network, said receiving device comprising:
 a network interface for connecting the receiving device it to one of said circuit-switched and packet-switched networks;
 a signaling processor connected to said network interface to received a circuit services domain message encapsulated in a tunneling packet sent by a sending device in one of a circuit-switched or packet-switched networks to said receiving device in the other one of said circuit-switched and packet-switched networks;
 said tunneling packet comprising a header containing an interworking option indicating an interworking protocol supported by the sending device, said interworking option comprising an interworking class value indicating a class of the interworking protocol supported by the sending device and a revision value indicating a version of the interworking protocol within the given class used by the sending device, wherein the received revision value is selected from a set of hierarchal values to indicate backward compatibility between the designated version of the interworking protocol and at least one other version of the interworking protocol.

20. The receiving device of claim 19 wherein the receiving device comprises a mobile terminal in a packet-switched network and the sending device comprises an interworking function in said circuit-switched network.

21. The receiving device of claim 19 wherein the receiving device comprises an interworking function in said circuit-switched network and the sending device comprises a mobile terminal in a packet-switched network.

22. The receiving device of claim 19 wherein the signaling processor is further configured to:
 determine whether the interworking protocol indicated by the interworking option is supported by the receiving device; and
 if the specified interworking option is not supported by the receiving device, send a response message containing a new interworking option indicating an interworking protocol supported by the receiving device.

23. The receiving device of claim 22 wherein the new interworking option in the response message comprises a lower revision value to indicate the version of the interworking protocol supported by the receiving device.

24. The receiving device of claim 21 wherein the signaling processor is further configured to use the interworking protocol indicated by the new interworking option for subsequent signaling between the sending device and receiving device.

* * * * *